3,518,248
SCILLIGLAUCOSIDIN - α - L-RHAMNOSIDE AND METHOD FOR ITS ISOLATION FROM WHITE SQUILL
Franz Pattermann, Ingelheim am Rhein, Germany, assignor to Boehringer Ingelheim G.m.b.H., Ingelheim am Rhein, Germany, a corporation of Germany
Filed Sept. 26, 1967, Ser. No. 670,719
Claims priority, application Germany, Oct. 4, 1966,
B 89,199
Int. Cl. C07c 173/00
U.S. Cl. 260—210.5                        4 Claims

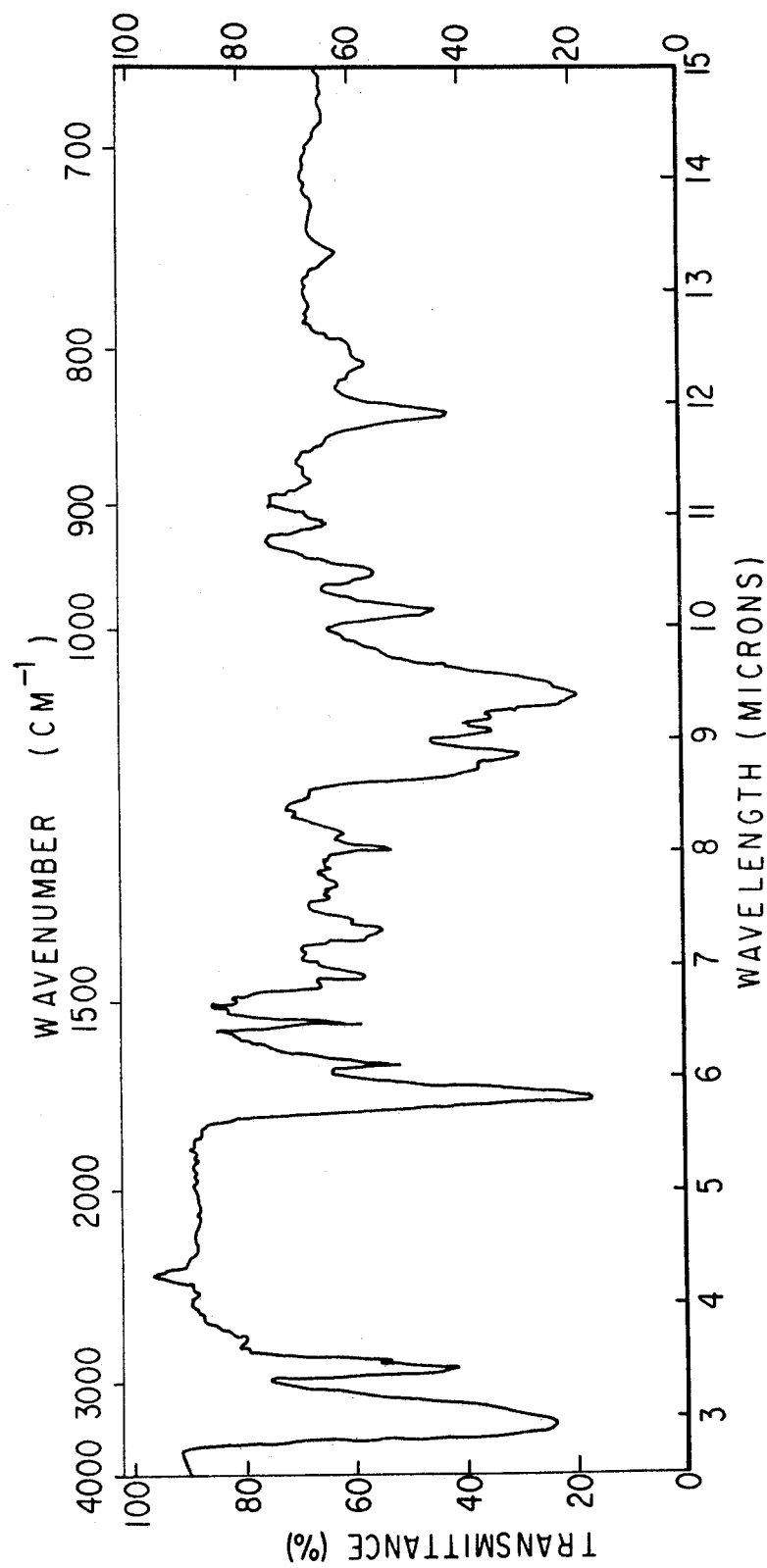

ABSTRACT OF THE DISCLOSURE

The new cardiac-active principle Scilliglaucosidin-α-L-rhamnoside useful for increasing the contractibility of the heart muscle, diminishing the heart rate and improving cardiac efficiency in warmblooded animals, and a method of isolating it from the mother liquor of the proscillaridin A isolation process.

THE PRIOR ART

A. Stoll et al. reported some years ago [Ullmans Enzyklopädie der technischen Chemie, 3rd ed., vol. 8 (1957), page 234 et seq.] that the white sea onion or squill, *Scilla (Urginea) maritima* L. Baker, Var. alba, contains a number of pharmacologically useful cardiac-active glycosides; among which especially proscillaridin A has recently acquired considerable therapeutic significance.

This invention relates to a novel cardiac-active principle isolated from white squill, namely scilliglaucosidin-α-L-rhamnoside, as well as to a process for isolating this glycoside from the waste liquor of the proscillaridin A recovery procedure.

More particularly, I have discovered that white squill contains another cardiac-active glycoside which has previously not been described in the literature, and that this novel glycoside can be economically isolated from the mother liquor obtained in the known process for recovery of proscillaridin A.

The recovery of proscillaridin A is effected by a process which has been described in the literature, namely by fermenting fresh or dried white squill in the presence of water, extracting the fermentation mixture with a suitable solvent, freeing the extract solutions of ballast material by means of customary purification procedures, and subsequently isolating the proscillaridin A formed by fermentative degradation from the ballast-free solution by means of crystallization [see, for example, A. Stoll et al., Helv. Chim. Acta 16, 703 (1933); or German Auslegeschrift, 1,198,484].

The mother liquor of the crystallization step contains the novel cardiac-active glycoside according to the present invention along with residual proscillaridin A and substantial amounts of additional ballast material.

The novel glycoside according to the present invention, in contrast to proscillaridin A, is rather resistant to hydrolysis, and this property is advantageously utilized in accordance with the present invention to devise a simple and economical method for isolating and purifying the novel glycoside. In principle, the process of the present invention for the isolation of scilliglaucosidin-α-L-rhamnoside broadly comprises evaporating the mother liquor of the proscillaridin A crystallization step above referred to, dissolving the residue in a suitable solvent, such as methanol, and refluxing the solution for a short period of time with a dilute acid, preferably aqueous 1% sulfuric acid; the scillaridin formed thereby from the residual proscillaridin A content of mother liquor starting material precipitates out and is mechanically separated from the liquid, for instance by filtration. The liquid is then subjected to a purification procedure analogous to that applied to similar scillaglycoside solutions; for example, the liquid is repeatedly extracted with carbon tetrachloride in order to remove any residual aglycones and other ballast material, and the desider raw glycoside is then isolated by re-extraction of the aqueous methanolic sulfuric acid solution with chloroform or a mixture of chloroform and methanol. The chloroform extract solution thus obtained is then evaporated, and the residue is subjected to preliminary purification by chromatography over silicagel with addition of 5% water, using a mixture of methylene chloride and methanol (100:5) as the elution agent. Thereafter, the fractions enriched with the novel glycoside are subjected to another chromatographic purification procedure over silicagel with addition of 50% water, using a water-saturated mixture of ethyl acetate and methanol (100:0.5), from which the novel glycoside crystallizes in the form of tufted needles. The crystalline product is then further purified by recrystallization from hot aqueous 50% acetone.

After the novel crystalline glycoside product thus obtained is dried in vacuo over phosphorus pentoxide at 80° C., elemental analysis thereof gives the following values: C=65.25%; H=7.36%; O=27.65%. Hence, the empirical formula is $C_{30}H_{40}O_9 \cdot \frac{1}{2}H_2O$. In addition, the novel glycoside of the instant invention has the following characteristic identifying data:

Melting point: 197–198° C. (decomposition), uncorrected.
Specific optical rotation: $[\alpha]_D^{20} = -45.0° \pm 2°$ (c.=1, methanol).
UV-spectrum: Absorption maximum at 298 mµ log ε=3.73).
IR-spectrum: Peakbands at 2700, 1710, 1640 and 1535 cm.$^{-1}$, as shown in the attached drawing, which is the infrared-spectrum curve of the novel glycoside embedded in a KBr-pellet.
Color reactions:
(a) Liebermann-Burchard reagent: Color transition from violet-pink through blue to blue-green.
(b) Rosenheim reagent: Negative.
(c) Hot concentrated formic acid: Green.

Characteristic data from thin-layer chromatography on silicagel-G-plates after triple development with water-saturated ethyl formate as the flow agent (identification by spraying with 20% SbCl$_3$):R$_f$=0.35; color:dirty green-grey. For comparison, proscillaridin:R$_f$=0.42; color:blue-violet.

Reaction of the novel glycoside with acetic acid anhydride in anhydrous pyridine yields a tri-O-acetyl compound of the empirical formula $C_{36}H_{46}O_{12}$, M.P. 185–188° C. uncorrected, $[\alpha]_D^{20} = -34.6° \pm 2°$ (c.=1, methanol).

Reaction of the novel glycoside with hydroxylamine hydrochloride yields an oxime of the empirical formula $2 \cdot (C_{30}H_{41}O_9N) \cdot 1.5\ H_2O$, M.P. 178–184° C. (decomposition), $[\alpha]_D^{20} = -41.0° \pm 2°$.

Acid hydrolysis of the novel glycoside under severe conditions (5 hours at 105° C. with aqueous 1% sulfuric acid) yields an aglycone of the empirical formula $C_{24}H_{28}O_4$, M.P. 223–228° C., $[\alpha]_D^{20} = -151°$ (chloroform). These characteristic values correspond to those reported in the literature for $\Delta^{3,5}$-3-anhydroscilliglaucosidin [Stoll et al., Helv. Chim. Acta 35, 2513 (1952)]. The sugar component isolated from the hydrolysis solution was L-rhamnose, which was identified by the determination of the melting point, optical rotation and chromatographic comparison with a known sample of L-rhamnose. The p-bromophenyl-hydrazone prepared from the sugar isolated from the hydrolysis solution also had the same characteristic values as those reported in the literature for L-rhamnose-p-bromophenyl-hydrazone.

All of the above analytical data prove that the novel cardiac glycoside according to the present invention is scilliglaucosidin-α-L-rhamnoside.

The following examples further illustrate the present invention and will enable others skilled in the art to understand it more completely. It should be understood, however, that the invention is not limited solely to the particular examples given below.

EXAMPLE 1

(a) Dried white squill was admixed with water, the mixture was allowed to ferment, the fermentation slurry was extracted with methanol, and after working up and purifying the extract solutions in customary fashion proscillaridin A was isolated by crystallization from methanol. The methanolic mother liquor obtained from the crystallization was then evaporated, and the residue was processed as follows to recover scilliglaucosidin-α-L-rhamnoside:

(b) 380 gm. of the residue were dissolved in 3.8 liters of hot methanol, and the solution was admixed with 3.8 liters of aqueous 1% sulfuric acid at 50° C., accompanied by stirring. The acid solution was refluxed from 30 to 45 minutes on a water bath and then, while the reaction mixture was still hot, the scillaridin A formed by acid hydrolysis of the residual proscillaridin A in the residue was separated by vacuum filtration. 35 gm. of raw scillaridin A were obtained.

The filtrate was allowed to cool and was then extracted twice with 1 liter-batches of carbon tetrachloride, whereby residual dissolved scillaridin A, other aglycones and lipophilic impurities (a total of 39 gm. on a dry basis) were removed. The purified aqueous methanolic solution was extracted first twice and 1 liter-batches of chloroform and then three times with 0.5 liter-batches of a mixture of equal parts by volume of chloroform and methanol. The chloroform and chloroform/methanol extract solutions were evaporated to dryness in vacuo at a bath temperature of 50° C., leaving 215 gm. of a light yellow raw glycoside residue.

In order to remove the major amount of interfering impurities, the raw glycoside residue thus obtained was subjected to a preliminary purification treatment by column chromatography as follows:

The chromatographic column was prepared by moistening 2.2 kg. of silicagel, grain size 0.05–0.20 mm., with 110 cc. of water and then forming a slurry of this moist silicagel in a mixture of methylene chloride and methanol (100:5) in a glass column of suitable size.

215 gm. of the yellow raw glycoside residue were dissolved in 500 cc. of a mixture of methylene chloride and methanol (100:5), the solution was charged into the column and chromatographed with the same solvent mixture. The eluate was collected in fractions of 0.5 liter, and the composition of the individual fractions were checked by thin-layers chromatography. After a throughput of a total of 14 liters of solvent all of the impurities having an $R_f$-value higher than that of scilliglaucosidin-α-L-rhamnoside had been eluted from the column, these preliminary fractions contained 118 gm. of dry matter. The subsequent fractions (a total of 3 liters of eluate), which contained all of the scilliglaucosidin-α-rhamnoside, were combined and the solvent was distilled off in vacuo at a bath temperature of 50° C. 73 gm. of a faintly yellow solid substance were obtained as a residue.

For further purification the residue was again chromatographed on silicagel. For this purpose a glass column of suitable size was charged with a mixture of 1 kg. of silicagel and 500 cc. of water, and a solution of the faintly yellow residue in 200 cc. of a mixture of water-saturated ethyl acetate and methanol (100:0.5) was introduced into the column and was chromatographed with the same solvent mixture. After a preliminary fraction of 0.5 liter, which was discarded, the glycoside was eluted from the column. The main fraction (1 liter of eluate) was allowed to stand, whereupon a crystalline substance in the form of tufted needles began to separate out after a short period of time. Crystallization was allowed to proceed for 24 hours at room temperature, and then the crystalline product was separated by vacuum filtration, washed and dried in vacuo at 60° C.

35.5 gm. of pure scilliglaucosidin-α-L-rhamnoside were obtained. Another 5.5 gm. of the pure glycoside were recovered by subjecting the mother liquor from the crystallization step to renewed chromatography.

The pure crystalline glycoside thus obtained was recrystallized from a mixture of acetone and water (1:1), and the colorless needles were dried in vacuo at 80° C. over phosphorus pentoxide, whereupon they had a melting point of 197–198° C. (decomposition) and a specific optical rotation $[\alpha]_D^{20} + -45.0° \pm 20$ (in methanol).

EXAMPLE 2

200 gm. of the residue obtained by evaporating the mother liquor from the crystallization step of the proscillaridin A isolation procedure from white squill of Indian origin, as in Example 1a, were dissolved in 2 liters of methanol by refluxing the mixture, the resulting solution was allowed to cool to 35° C., and then 2 liters of aqueous 1% sulfuric acid at 35° C. were added while stirring. The acid reaction solution was stirred for three hours at 35° C., and the scillaridin A precipitated thereby was then separated by vacuum filtration. The filtrate was allowed to cool to room temperature and was then extracted twice with 0.5 liter-batches of carbon tetrachloride, which were discarded, and subsequently twice with 0.5 liter-batches of chloroform and then three times with 0.3 liter-batches of a mixture of chloroform and methanol (1:1). The chloroform and chloroform-methanol extract solutions were combined and dried with anhydrous sodium sulfate. The solvents were distilled out of the extract solution, leaving 140 gm. of a glycoside residue. The impurities contained in the residue were then removed, as described in Example 1, that is, by chromatography of the residue on 1.4 kg. of silicagel with 5% water, using a mixture of methylene chloride and methanol (100:5) as the elution agent. The dry residue (85 gm.) obtained after distilling off the solvent mixture was then subjected to further purification, as described in Example 1, that is, by chromatography on 1.2 kg. of silicagel with 600 cc. of water, using a mixture of water-saturated ethyl acetate and methanol (100:0.5) as the elution agent. The scilliglaucosidin-α-L-rhamnoside which crystallized out of the main fraction (38 gm.) was collected and then recrystalized from aqueous 50% acetone. The pure scilliglaucosidin-α-L-rhamnoside thus obtained had the same physical data as the end product of Example 1.

Scilliglaucosidin-α-L-rhamnoside has useful pharmacodynamic properties. More particularly, it increases the contractibility of the heart muscle, diminishes the heart rate and improves cardiac efficiency in warm-blooded animals, such as guinea pigs and cats.

For phamaceutical purposes, scilliglaucosidin-α-L-rhamnoside is administered to warm-blooded animals perorally or perenterally, preferably orally, as an active ingredient in customary dosage unit compositions, that is, compositions in dosage unit form consisting essentially of an inert pharmaceutical carrier and one dosage unit of the active ingredient, such as tablets, coated pills, wafers, capsules, solutions, suspensions, emulsions, syrups, suppositories and the like. One oral dosage unit of scilliglaucosidin-α-L-rhamnoside is from 0.00165 to 0.05 mgm./kg. body weight, preferably 0.0025 to 0.0165 mgm./kg. body weight.

A dosage unit composition comprising an effective cardiac-active unit dose of scilliglaucosidin-α-L-rhamnoside as the active ingredient may, in addition, also contain an effective unit dose of one or more cardiac-activity compounds, such as glycosides of the scilla or digitalis type; pyrimido-pyrimidine derivatives; or theophylline derivatives, such as 7-β-hydroxypropyl-theophylline, which simultaneously act as solubilizers; as well as compounds having other pharmacodynamic activities, such as sympathomimetics.

The following example illustrates a dosage unit composition comprising the novel glycoside according to the present invention as an active ingredient, and represents the best mode contemplated of putting the invention to practical use. The parts are parts by weight unless otherwise specified.

EXAMPLE 3

Drop solution for oral administration

The solution was compounded from the following ingredients:

| | Parts by vol. |
|---|---|
| (—) - 1 - p - hydroxyphenyl-2-methylaminoethanol-(1) | 50.00 |
| Scilliglaucosidin-α-L-rhamnoside | 0.25 |
| 7-β-hydroxypropyl-theophylline | 200.00 |
| Sodium metabisulfite ($Na_2S_2O_5$) | 1.50 |
| Sodium salt of EDTA | 1.50 |
| Tartaric Acid | 3.75 |
| Saccharin sodium | 1.00 |
| p-Hydroxybenzoic acid methyl ester | 0.45 |
| p-Hydroxybenzoic acid propyl ester | 15.00 |
| Ethanol | 75.00 |
| Demineralized water Q.s. ad | 1500.00 |

Compounding procedure

The scilliglaucosidin-α-L-rhamnoside was dissolved in the ethanol (solution A). The p-hydroxy-benzoic acid esters were dissolved in the entire required amount of hot demineralized water, the solution was allowed to cool, and then all the remaining ingredients were dissolved therein (solution B). Solution A was combined with solution B. The combined solution had a pH of 5.0 which may, if desired, be fixed with the aid of buffers. 1.5 cc. of the solution (20 drops) contained 0.25 mgm. of scilliglaucosidin-α-L-rhamnoside and, when administered perorally to a warmblooded animal of about 60 kg. body weight in need of such treatment, increased the contractability of the heart muscle, diminished the heart rate and improved cardiac efficiency.

It should be understood that the amount of scilliglaucosidin-α-L-rhamnoside in the above dosage unit composition example is merely illustrative and may be varied to achieve any desired value within the dosage unit range set forth above. Moreover, the amounts and nature of the inert carrier ingredients may be varied to meet particular requirements.

While the present invention has been illustrated with the aid of certain specific embodiments, it will be readily apparent to those skilled in the art that my invention is not limited to those embodiments and that various other changes and modifications may be made without departing from the spirit of the invention or the scope of the appended claims.

I claim:

1. The crystalline, substantially pure cadiac glycoside, scilliglaucoside-α-L-rhamnoside, having an ultarviolet absorption maximum at 298 m$\mu$ (log $\epsilon$=3.73), an infrared spectrum showing peakbands at 2700, 1710, 1640 and 1535 cm.$^{-1}$, a melting point of 197–198° C. (decomposition), and a specific rotation $[\alpha]_D^{20}$ of —45.0°±2° (in methanol).

2. The process of isolating the glycoside according to claim 1, which comprises subjecting the contents of the residual liquors obtained in the isolation of proscillaridin A from white squill to acid hydrolysis, separating the scillaridin precipitated thereby from the liquid phase, and isolating scilliglaucosidin-α-L-rhamnoside from said liquid phase by solvent extraction.

3. The process of isolating the crystalline, substantially pure glycoside according to claim 1, which comprises evaporating the mother liquor obtained in the crystallization step of the isolation procedure of proscillaridin A from white squill, dissolving the evaporation residue in methanol, heating the methanolic solution with a dilute mineral acid, separating the scillaridin precipitated thereby from the liquid phase, extracting the liquid phase first with carbon tetrachloride, then with chloroform and finally with a mixture of equal volumes of chloroform and methanol, combining the chloroform and chloroform/methanol extracts, evaporating the combined extract solution to dryness, and isolating crystalline, substantially pure scilliglaucosidin-α-L-rhamnoside from the evaporation residue by chromatography on silicagel.

4. The process of isolating the crystalline, substantially pure glycoside according to claim 1, which comprises evaporating the mother liquor obtained in the crystallization step of the isolation procedure of proscillaridin A from white squill, dissolving the evaporation residue in methanol, heating the methanolic solution with aqueous 1% sulfuric acid, separating the scillaridin precipitated thereby from the liquid phase, extracting the liquid phase first with carbon tetrachloride, then with chloroform and finally with a mixture of equal volumes of chloroform and methanol, combining the chloroform and chloroform/methanol extracts, evaporating the combined extract solution to drynes, subjecting the evaporation residue to chromatography on silicagel admixed with 5% by weight of water, based on the weight of dry silicagel, using a mixture of methylene chloride and methanol (100:5 by volume) as the elution agent, collecting the fractions containing scilliglaucosidin-α-L-rhamnoside, subjecting said fractions to chromatography on silicagel admixed with 50% by weight of water, based on the weight of dry silicagel, using a mixture of water-saturated ethyl acetate and methanol (100:0.5 by volume) as the elution agent, and isolating scilliglaucosidin-α-L-rhamnoside from the eluate by crystallization.

References Cited

UNITED STATES PATENTS

| 2,294,811 | 9/1942 | Stoll et al. | 260—210.5 |
| 3,361,630 | 1/1968 | Steidle | 260—210.5 |

LEWIS GOTTS, Primary Examiner

J. R. BROWN, Assistant Examiner

U.S. Cl. X.R.

424—182